United States Patent
Vogt et al.

(10) Patent No.: US 11,657,422 B2
(45) Date of Patent: May 23, 2023

(54) REWARD SYSTEM FOR AUTONOMOUS RIDESHARE VEHICLES

(71) Applicant: GM Cruise Holdings LLC, San Francisco, CA (US)

(72) Inventors: Kyle Vogt, San Francisco, CA (US); Mohamed Mostafa Elshenawy, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/319,491

(22) Filed: May 13, 2021

(65) Prior Publication Data

US 2022/0366444 A1    Nov. 17, 2022

(51) Int. Cl.
*G06Q 30/0207* (2023.01)
*G06Q 30/0226* (2023.01)

(52) U.S. Cl.
CPC ..... *G06Q 30/0224* (2013.01); *G06Q 30/0226* (2013.01)

(58) Field of Classification Search
None
See application file for complete search history.

(56) References Cited

U.S. PATENT DOCUMENTS

| | | | | |
|---|---|---|---|---|
| 10,962,372 | B1 * | 3/2021 | Rao | G06N 3/0454 |
| 11,210,689 | B2 * | 12/2021 | Watanabe | G06Q 30/0207 |
| 2011/0307188 | A1 * | 12/2011 | Peng | G01C 21/3697 |
| | | | | 702/33 |
| 2014/0032297 | A1 * | 1/2014 | Germann | G06Q 30/0226 |
| | | | | 705/14.27 |
| 2015/0081404 | A1 * | 3/2015 | Basir | G06Q 30/08 |
| | | | | 705/14.1 |
| 2016/0370194 | A1 * | 12/2016 | Colijn | G08G 1/205 |
| 2017/0267256 | A1 * | 9/2017 | Minster | G01C 21/3461 |
| 2020/0056901 | A1 * | 2/2020 | Engle | G01C 21/3446 |
| 2020/0216094 | A1 * | 7/2020 | Zhu | G01C 21/3407 |

OTHER PUBLICATIONS e. Lance Eliot, "Why You'll Be Thankful and Leave a Tip After Riding in a Self-Driving Car", retrieved from https://www.forbes.com/sites/lanceeliot/2019/11/28/why-youll-be-thankful-and-leave-a-tip-after-riding-in-a-self-driving-car/?sh=1a94878c4b57 published on Nov. 28, 2019 (Year: 2019).* k. Chandar et al., "The Drivers of Social Preferences: Evidence from a nationwide tipping field experiment", retrieved from https://www.nber.org/system/files/working_papers/w26380/w26380.pdf, published on Oct. 2019 (Year: 2019).*

* cited by examiner

*Primary Examiner* — Sam Refai
(74) *Attorney, Agent, or Firm* — Akona IP (57) ABSTRACT

A fleet management system implements a rewards-based feedback system to receive feedback from users of a rideshare service that provides rides using autonomous vehicles (AVs). The fleet management system maintains user accounts associated with each user and provides reward points to each user account. When the user is riding in an AV, the user can access a user interface to select a portion of the reward points and reward them to the AV. The fleet management system may analyze the point rewards to identify individual user preferences, to identify preferences across users, or to identify AVs for maintenance or other types of modification.

20 Claims, 6 Drawing Sheets

REWARD SYSTEM FOR AUTONOMOUS RIDESHARE VEHICLES

TECHNICAL FIELD OF THE DISCLOSURE

The present disclosure relates generally to autonomous vehicles (AVs) and, more specifically, to methods and systems for receiving feedback from users of an AV-based ride service in the form of rewards.

BACKGROUND

In conventional ride service implementations, such as taxicabs and current app-based ridesharing systems, a human driver drives a passenger in a car. After the ride, the passenger pays for the fare, and the passenger can also provide a discretionary tip to the driver. The tip may be related to various factors, such as the route selected by the driver, the quality of driving, the cleanliness of the vehicle, the comfort of the vehicle, the personality of the driver, etc. The driver can generally correlate higher tips to a higher overall ride quality, and the driver may make adjustments between rides to provide a higher quality of service and obtain larger tips.

In an AV-based ridesharing system, the AVs providing rides to passenger do not have human drivers that the passengers tip. This removes an important channel of information about ride quality.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Users of an AV-enabled ridesharing system are not expected to provide monetary tips, since AVs do not have human drivers to receive the tips. This eliminates an important feedback channel that users may use to indicate ride quality, and in particular, acknowledge a high quality ride. While both conventional and AV-based ridesharing platforms can request rating or review information, a tip-based system may provide a different type of feedback from ratings or reviews. For example, a user may provide a 5/5 rating for any ride that meets the user's expectations, but provide an unusually large tip to a ride that exceeds the user's expectations. When tip-based feedback is removed, the ride platform may not learn which features go above and beyond users' expectations. Furthermore, at least some users may prefer to engage with a tip-based system, and be more inclined to provide tips than to provide ratings or reviews.

A reward-based feedback system that enables users of an AV-based ridesharing system to provide rewards to AVs is described herein. It is expected that users would not provide monetary tips to AVs, since AVs do not have drivers to receive the monetary tips. To enable reward-based feedback and increase user engagement, the ridesharing platform provides points to users that they can assign to AVs as rewards or tips. For example, if an AV is in particularly good condition, drives safely and efficiently in challenging conditions (e.g., near pedestrians, bicycles, or heavy traffic), makes good time, or selects a great drop-off location, the user can select a portion of points in the user's account to reward the AV for its performance. The points are deducted from the user's account and added to an account associated with the AV.

As used herein, a "point" refers to a unit within the reward system. The reward system may refer to the reward points using different names, such as chips, tokens, bucks, etc., or using the name of a fake currency, such as "AV dollars," "car coins," "bus bucks," etc. The rewards themselves may be referred to using various names, such as tips, awards, rewards, gratuities, bonuses, etc. In some embodiments, the points may not be referred to using discrete units, e.g., the user may see a visualization of a bucket with their points, and the user can select a portion of the bucket to reward to the AV, without any numbers being displayed to the user. In other embodiments, the reward system may correlate some object to the points; for example, the points may be represented as flowers, and the user can select a flower to reward to the AV, or the user can create a bouquet of multiple flowers to reward the AV. In some embodiments, each point has the same value, while in other embodiments, different points may have different values. For example, in the flower-based system, the value of a rose may be higher than the value of a carnation, or a user may perceive the rose as having a higher value than the carnation (or vice versa).

This point-based reward system can enhance user engagement with the platform. For example, each AV may include a display of points previously rewarded to the AV. Users may be interested to know how many points the AV providing their rides have accumulated and to see their points get added to their AVs' totals.

The points-based reward system can also help the ridesharing platform learn preferences of individual users, and of their user base. In some examples, a user can provide additional information indicating a particular feature that caused the user to provide the reward. Alternatively, the AV or AV management system can infer a reason for the reward based on comparing the timing of the reward to actions taken by the AV during a period of time preceding the reward. For example, if a user provides a reward after a difficult AV maneuver, or after the sound system starts playing a popular song, the AV can infer that the reward was related to the maneuver or the song choice. At an individual level, an AV or AV management system can program features of the AV based on the feedback, e.g., the AV can choose similar music or a similar route for the user's subsequent rides. The AV management system can also learn preferences across many users and adjust AV features accordingly. For example, the AV management system may provide alternate features to different sets of AVs (e.g., different interior features, different software features, different software versions, etc.) and learn, by comparing the rewards given to the sets of AVs, which of the alternate features is most popular with users.

Embodiments of the present disclosure provide a method for receiving feedback from a user of an AV ride service including maintaining a user account associated with a user of a ride service, the user account comprising a first number of points provided to the user; receiving a ride request from the user, the ride request comprising a pickup location of the user; selecting an AV to service the ride request from a fleet of AVs; subsequent to the AV initiating the ride service at the pickup location, providing, to the user, an interface enabling the user to select at least a portion of the points in the user account to provide as a reward to the AV; receiving a reward of a second number of points from the user to the AV; and deducting the second number of points from the first number of points in the user account.

Embodiments of the present disclosure also provide a method for receiving feedback for an autonomous ride service that includes maintaining a plurality of user accounts associated with respective users of a ride service, each of the plurality of user accounts comprising points for the respective user to reward AVs providing a ride service to the user; maintaining a plurality of AV accounts associated respective AVs in a fleet of AVs, each of the plurality of AV accounts comprising points rewarded to the respective AV by users of the AV; comparing the points rewarded to a first AV of the plurality of AVs to the points rewarded to at least one other of the plurality of AVs; and identifying the first AV for modification based on the points rewarded to the first AV relative to the points rewarded to the at least one other AV.

Embodiments of the present disclosure also provide for a system for receiving AV rider feedback that includes a user data manager, a UI server, and a vehicle manager. The user data manager is to maintain, in a user account of a user of a ride service, a number of points provided to the user. The UI server is to receive a ride request to provide a ride to the user, the ride request comprising a pickup location; and receive a reward of a portion of points in the user account selected by the user to provide to an AV as a reward to the AV. The vehicle manager is to select, from a fleet of AVs, an AV to service the ride request; and instruct the selected AV to drive to the pickup location and pick up the user, wherein the UI server receives the reward subsequent to the AV picking up the user.

As will be appreciated by one skilled in the art, aspects of the present disclosure, in particular aspects of receiving feedback from users of an AV service, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV System for Receiving User Feedback

Figure 1:
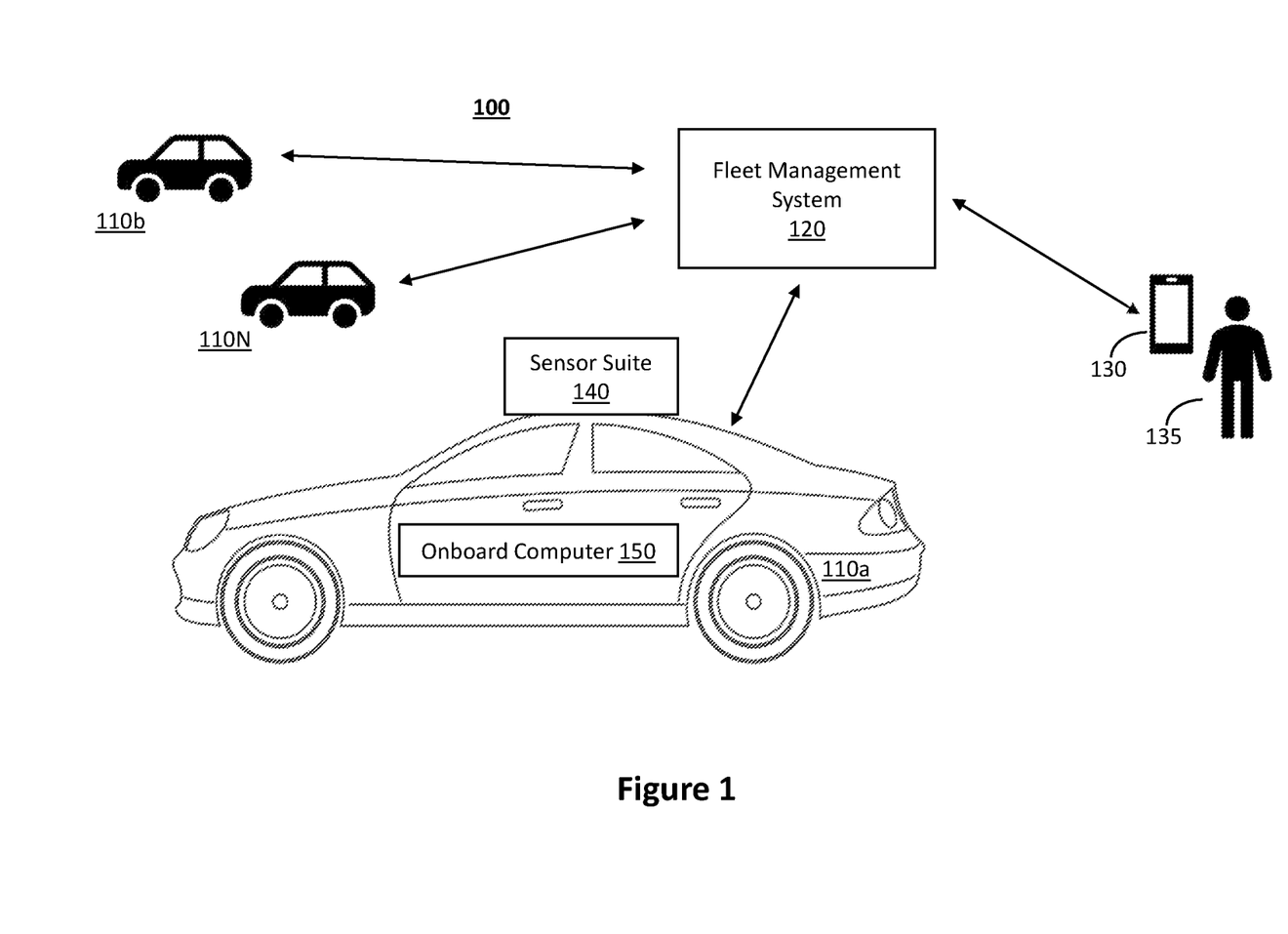
FIG. 1 is a block diagram illustrating a system including a fleet of AVs used for an autonomous ride service according to some embodiments of the present disclosure.

FIG. 1 is a block diagram illustrating a system 100 including an example AV fleet that can receive rewards-based feedback from users, according to some embodiments of the present disclosure. The system 100 includes a fleet of AVs 110, including AV 110a, AV 110b, and AV 110N, a fleet management system 120, and a user device 130. For example, a fleet of AVs may include a number N of AVs, e.g., AV 110a through AV 110N. AV 110a includes a sensor suite 140 and an onboard computer 150. AVs 110b through 110N also include the sensor suite 140 and the onboard computer 150. A single AV in the fleet is referred to herein as AV 110, and the fleet of AVs is referred to collectively as AVs 110.

The fleet management system 120 receives service requests for the AVs from user devices, such as user device 130. For example, the user 135 accesses an app executing on the user device 130 and, using the app, enters a ride request. The user device 130 transmits the ride request to the fleet management system 120. The ride request includes at least a pickup location (e.g., the current location of the user device 130) and may include a drop-off location, a number of passengers, a pickup and/or drop-off time, or other information. The fleet management system 120 selects an AV from the fleet (e.g., AV 110a) and dispatches the selected AV to the pickup location to carry out the ride request.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include interior and exterior cameras, radar sensors, sonar sensors, lidar (light detection and ranging) sensors, thermal sensors, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110.

The onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The fleet management system 120 manages the fleet of AVs 110. The fleet management system 120 may manage one or more services that provides or uses the AVs, e.g., a service for providing rides to users using the AVs. The fleet management system 120 also manages fleet maintenance tasks, such as fueling, inspecting, and servicing of the AVs. The fleet management system 120 also implements a reward system for receiving feedback from users of the ride service. The AVs 110 and the fleet management system 120 may connect over a public network, such as the Internet. The fleet management system 120 is described further in relation to FIG. 4.

The user device 130 is a personal device of the user 135, e.g., a smartphone, tablet, computer, or other device for interfacing with a user of the fleet management system 120. The user device 130 and the fleet management system 120 may connect over a public network, such as the Internet. The user device 130 may provide one or more applications (e.g., mobile device apps or browser-based apps) with which the user 135 can interface with a service that provides or uses AVs, such as a service that provides rides to users in AVs. The service, and particularly the AVs associated with the service, is managed by the fleet management system 120, which may also provide the application to the user device 130. The application may provide a user interface to the user 135 during the rides, such as a map showing the location of the AV 110 and the destination location. The user interface provided on the user device 130 may also enable users to engage with the reward system, e.g., as shown in FIG. 2.

Figure 3:
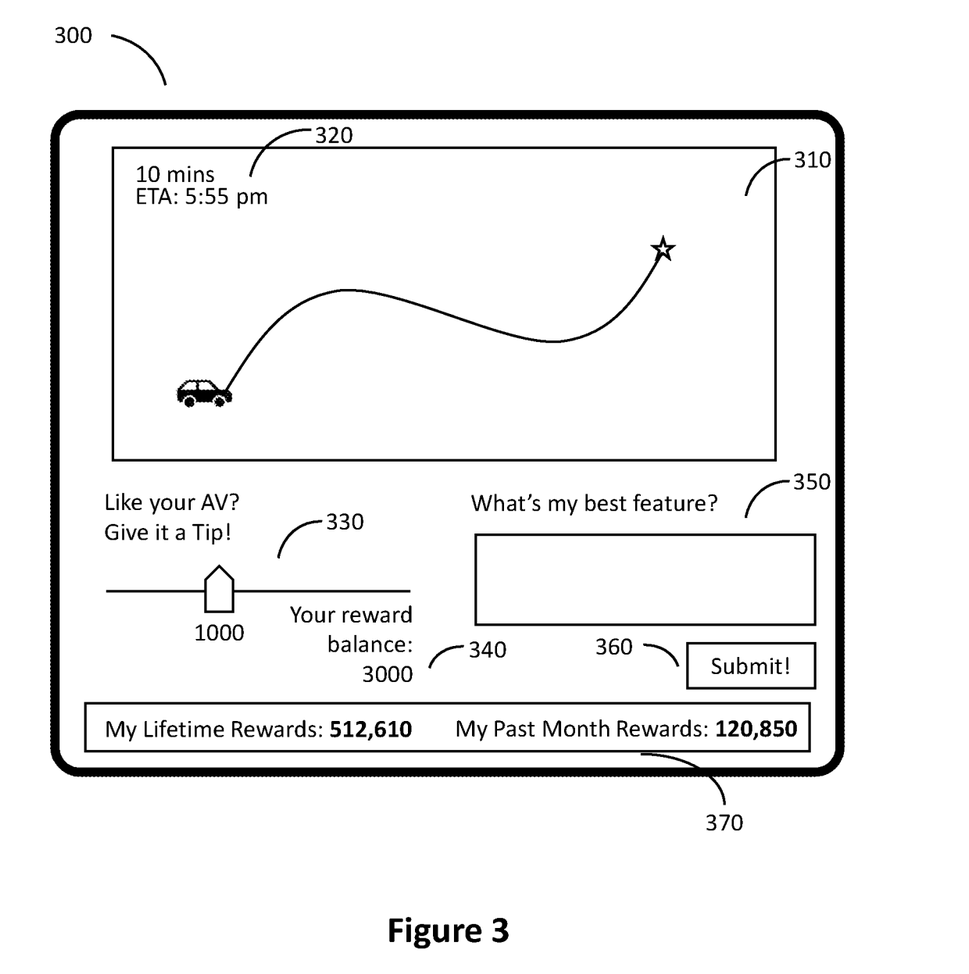
FIG. 3 is an example in-vehicle user interface providing information about the AV and enabling the user to provide a reward to the AV according to some embodiments of the present disclosure.

In some embodiments, the AVs 110 also include user interfaces, enabled by the fleet management system 120, with which users can engage with the reward system and other AV features. An example of an interface provided by the AV 110 is shown in FIG. 3.

Example Mobile Device User Interface for Receiving Rewards

Figure 2:
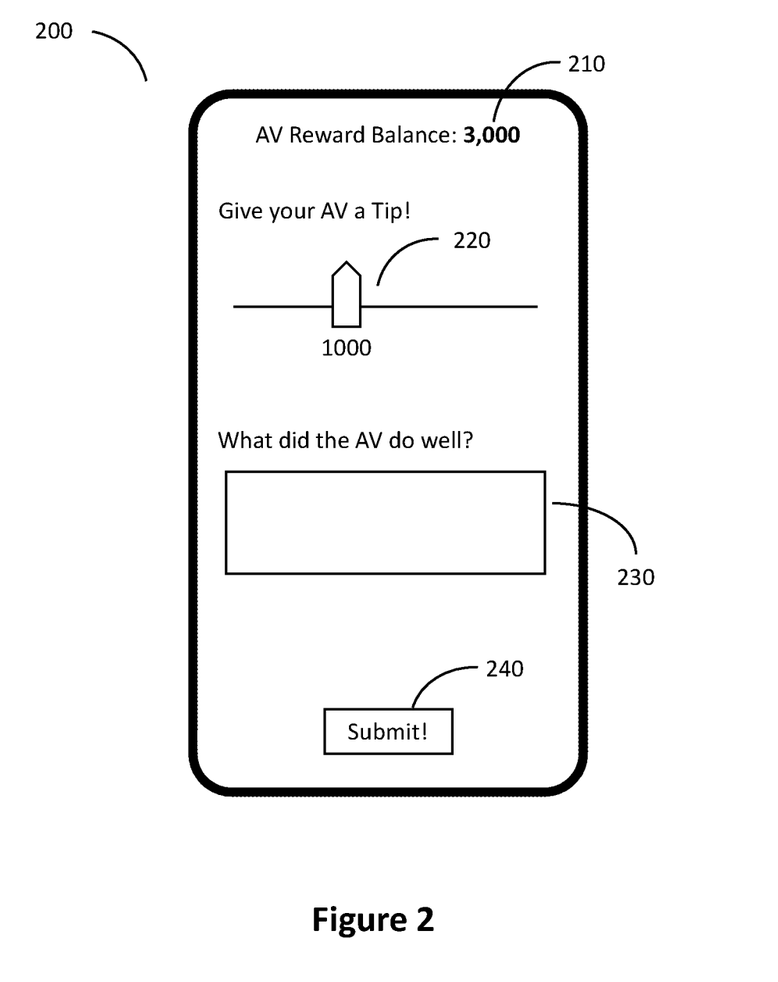
FIG. 2 is an example mobile device user interface for a user to provide a reward to an AV according to some embodiments of the present disclosure.

FIG. 2 is an example mobile device user interface for a user to provide a reward to an AV according to some embodiments of the present disclosure. As noted above, the fleet management system 120 provides an application, e.g., a ride service application, that provides user interfaces on the user device 130. The interface 200 shown in FIG. 2 may be displayed if a user selects an option in the ride service application to reward or tip the AV. The interface 200 includes a current point balance 210, reward selector 220, feature input component 230, and submit button 240.

The user interface displays the current point balance 210 in the user's account. As described in relation to FIG. 4, the fleet management system 120 maintains a balance of points in the user's account, and provides the current balance to the user device 130 for display in the interface 200. The points are provided to the user by the fleet management system 120.

The reward selector 220 enables the user to select a portion of the current balance of points to reward to the user.

In this example, the reward selector 220 is a slider bar with which the user can select a value along the slider range. The range may be based on the current point balance, e.g., the top of the range is the current point balance (in the example of FIG. 2, 3000 points). The user can use the slider bar to select the current point balance or any number of points below the current point balance. In other examples, different interface components or combination of components for selecting a portion of the balance of points can be provided, such as a text box, a selection menu, a radio button interface, etc. If non-numerical rewards are used, the reward selector 220 is chosen based on the selected type of reward, e.g., allowing users to select particular tokens to reward the AV.

In this example, the interface 200 includes a feature input component 230 that enables a user to indicate one or more specific AV features that encouraged the user to provide the reward to the AV. In this embodiment, the feature input component 230 includes a text box. If a user selects the feature input component 230, the user device may display an on-screen keyboard that the user can use to type in one or more AV features, or the user may use an external keyboard. In other embodiments, the feature input component 230 alternately or additionally includes a set of selectable options (e.g., in a radio button interface or selection menu) that the user can choose from. For example, the feature input component 230 may include options relating to AV behavior (e.g., drove well near pedestrians, drove well near bicycles, perfect pickup location, perfect drop-off location, etc.). The feature input component 230 may include options relating to the in-vehicle experience, such as clean interior, comfortable seats, great music, fun games, etc. In some embodiments, the selectable options may be dynamic, based on the AV's actions and in-vehicle experience. For example, the "great music" option may only be displayed if the AV is playing music, and the "drove well near pedestrian" option may only be displayed if the AV recently detected a pedestrian in its environment. In some embodiments, the feature input component 230 is not included. In some embodiments, the user is required to input at least one feature, while in other embodiments, the feature input is optional.

After the user has selected the reward and input any specific features, the user selects the submit button 240 to submit the reward. After the user selects the submit button 240, the application or the fleet management system 120 deducts the points rewarded to the AV from the user's current balance. For example, if the user selects the submit button 240 after selecting the 1000 point reward shown in FIG. 2, the current point balance 210 changes from 3000 to 2000. If the user has points remaining, the user may provide additional rewards to the AV, or to a later AV that the user receives a ride from.

It should be understood that the interface for receiving a reward from a user may be configured differently from the interface 200 shown in FIG. 2. For example, the interface 200 or portions of the interface 200 may be displayed as a pop-up window or series of pop-up windows. For example, the user can first select the reward using the reward selector 220 in a first window, and then optionally input a feature using the feature input component 230 in a second window. As another example, one or more components of the interface 200 (e.g., the reward selector 220) may be displayed in another interface screen, e.g., an interface showing the current ride status (e.g., a map) and/or various AV options (e.g., routing options, comfort and entertainment options, etc.).

Example In-Vehicle User Interface for Receiving Rewards

FIG. 3 is an example in-vehicle user interface providing information about the AV and enabling the user to provide a reward to the AV according to some embodiments of the present disclosure. In some embodiments, the AVs 110 include in-vehicle displays, such as touchscreens displayed on a seatback, along a wall, or at another location in the passenger compartment of the AV 110. The in-vehicle display may provide information about the ride and various options for the user to engage with the AV, such as controlling cabin temperature, windows, music, routing, etc.

The example interface 300 shown in FIG. 3 includes ride information, including a map 310 showing the current location of the AV (the car icon), the destination of the AV (the star), and a planned route to the destination location. The ride information also includes timing information 320, which displays the expected time to arrival (10 minutes) and the expected time of arrival (5:55 pm).

Below the ride information, the interface 300 includes a reward selector 330, a current point balance 340, a feature input component 350, a submit button 360, and an AV point balance 370. The reward selector 330, current point balance 340, feature input component 350, and submit button 360 are similar to the reward selector 220, current point balance 210, feature input component 230, and submit button 240, respectively, described above with respect to FIG. 2. In this example, the fleet management system 120 provides the balance of points of the user in the AV (i.e., the user that submitted the ride request) to the in-vehicle display for display as the current point balance 340.

The fleet management system 120 also maintains a balance of points that have been rewarded to the AV and provides the balance to the AV for display in the AV point balance 370. In this example, the AV point balance 370 includes both a total number of points rewarded to the AV in its lifetime (e.g., since it joined the AV fleet 110 and began providing ride service) and in the past month. In other embodiments, only one of these numbers may be displayed, or rewards from a different recent time period (e.g., today's rewards, this weeks' rewards, etc.) may be displayed.

As described above, different forms of reward points may be used, and different reward points may be displayed differently. For example, in the flower-based reward system, the in-vehicle display may display all flowers that have been rewarded to the AV, or all flowers that have been rewarded in a time period (e.g., one or two weeks, representing a typical longevity of cut flowers). The user can select additional flowers from the user's account and displayed in user interface to add to the in-vehicle display.

Example Fleet Management System

Figure 4:
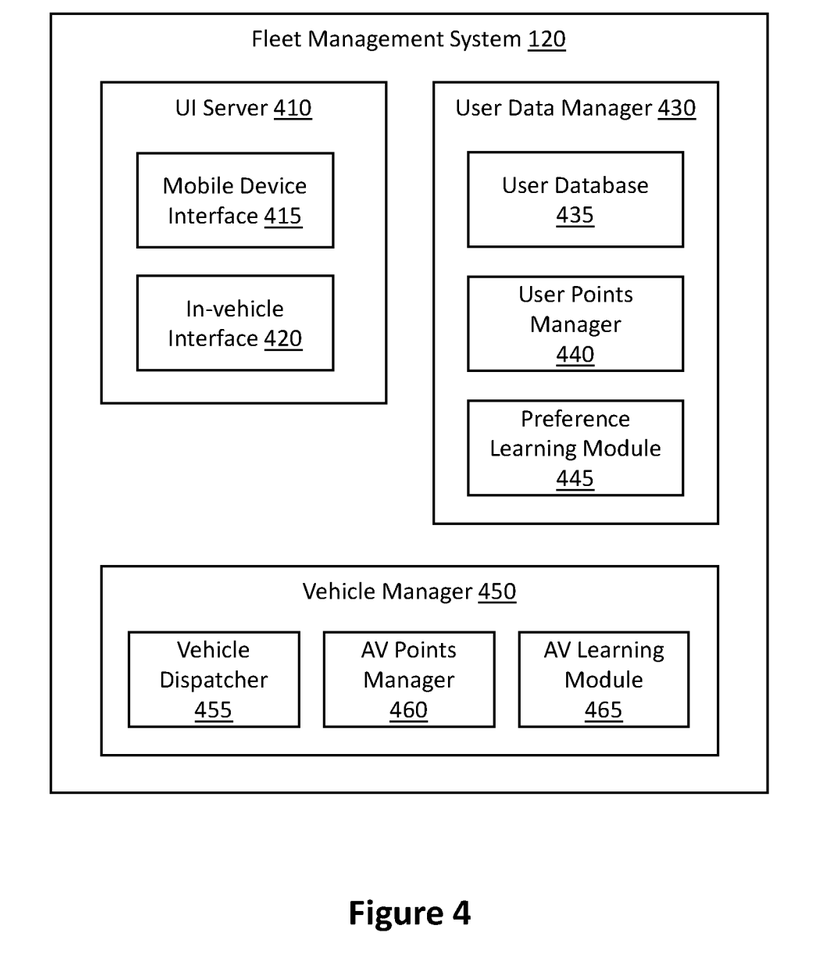
FIG. 4 is a diagram illustrating a fleet management system for implementing a reward system and learning user preferences according to some embodiments of the present disclosure.

FIG. 4 is a block diagram illustrating the fleet management system 120 according to some embodiments of the present disclosure. The fleet management system 120 includes a UI (user interface) server 410, a user data manager 430, and a vehicle manager 450. The UI server 410 includes a mobile device interface 415 and an in-vehicle interface 420. The user data manager 430 includes a user database 435, a user points manager 440, and a preference learning module 445. The vehicle manager 450 includes a vehicle dispatcher 455, an AV points manager 460, and an AV learning module 465. In alternative configurations, different and/or additional components may be included in the fleet management system 120. Further, functionality attributed to one component of the fleet management system 120 may be accomplished by a different component included in the fleet management system 120 or a different system than those illustrated.

The UI server 410 is configured to communicate with client devices that provide user interfaces to users. For example, the UI server 410 may be a web server that provides a browser-based application to client devices, or the UI server 410 may be a mobile app server that interfaces with a client app installed on client devices. The client devices include personal user devices, such as the user device 130. The client devices may also include devices mounted in the AVs 110, such as a display screen or touch screen device mounted in the passenger compartment of an AV. In this example, the fleet management system 120 includes one UI server or set of UI servers enabling the mobile device interface 415 on users' personal devices, and another UI server or set of UI servers enabling the in-vehicle interface 420 on in-vehicle devices. The UI server 410 may be implemented differently than shown here; for example, a map interface module may be included in UIs provided to both user devices and in-vehicle devices. While the mobile device interface 415 and in-vehicle interface 420 are represented in FIG. 4 as part of the fleet management system 120, it should be understood that these interfaces may be at least in part implemented on mobile devices and/or in-vehicle devices, e.g., by an application executing locally on a mobile device or in-vehicle device that is in communication with the fleet management system 120.

The mobile device interface 415 enables users to submit requests to a ride service provided or enabled by the fleet management system 120, e.g., to request a ride from an AV 110. The ride request may include any of the information described with respect to FIG. 1, including a pickup location. The mobile device interface 415 provides status information after the ride request has been submitted, e.g., an estimated arrival time of the selected AV at the pickup location, and information for the user to identify the selected AV. After the selected AV has picked up the requesting user, the mobile device interface 415 further provides information about the ride and options for the ride, such as routing settings, temperature settings, music selections, AV behavior, etc. In addition, the mobile device interface 415 provides information about a rewards system and an option for the user to provide a reward to the AV 110. For example, the mobile device interface 415 includes the interface 200 shown in FIG. 2.

The in-vehicle interface 420 provides information and/or options for the user during the ride via the in-vehicle display. An example in-vehicle interface is shown in FIG. 3. In some embodiments, the in-vehicle interface 420 is interactive, e.g., via a touch screen or other user input device. For example, the user can provide a reward to the AV via the in-vehicle interface, as described with respect to FIG. 3. In other embodiments, the in-vehicle interface is not interactive, but may reflect user input submitted through the mobile device interface 415. For example, if the user 135 provides a reward via the user device 130 using the mobile device interface 415, the in-vehicle interface 420 can update a display of reward points received by the AV (e.g., the AV point balance 370) to reflect the reward.

The user data manager 430 manages and stores data associated with users of the ride service. Users may create accounts with the fleet management system 120, which stores user information associated with the user accounts in the user database 435. The user information may include, among other things, identifying information (e.g., name, user name), password, payment information, home address, contact information (e.g., email and telephone number). The user database 435 may further include usage information, such as ride and payment history. The user database 435 may include explicit preferences and settings input by the user, and preferences learned by the user data manager 430, e.g., by the preference learning module 445. The user database 435 further stores reward points available to the users in their user accounts. While one user database 435 is shown, in other embodiments, different user data may be stored in separate databases, e.g., personally identifiable data (PII) and payment information may be stored in a separate and more secure database than the reward points.

The user points manager 440 manages the reward points in the users' accounts. When a user rewards an AV with a selected portion of the points in the user's account, the user points manager 440 deducts the selected portion of points from the user's account. The user points manager 440 also adds points to users' accounts so that the users have points to reward the AVs. The user points manager 440 provides an initial number of points to each user, e.g., upon signing up for an account or requesting a first ride. The user points manager 440 also adds additional points to user accounts to replenish the account. For example, the user points manager 440 may add points to a user's account on a periodic basis, e.g., adding more points each week or each month. As another example, the user points manager 440 adds points to the user's accounts based on the number or frequency of rides provided to the user. The user points manager 440 may determine if a user has engaged the ride service for at least a threshold number of rides (e.g., 10), and in response, add more points to the user's account. The user points manager 440 may determine to add points based on some other basis, e.g., based on the number of miles the user has traveled. In some embodiments, the user points manager 440 determines to add points to a user's account based on the user's reward behavior, e.g., the user points manager 440 adds more points after the user has emptied the reward account, or after the user has provided at least a threshold number of rewards.

In some embodiments, when the user points manager 440 determines to add points to a user account, the user points manager 440 adds a fixed number of points, or replenishes the number of points up to a fixed number (e.g., each month, the user points manager 440 resets the number of points to 50, no matter how many points a user has rewarded to AVs). In other embodiments, the user points manager 440 determines a number of points to provide, e.g., based on historical ride data (e.g., ride data stored in the user database 435) describing the ride history, e.g., number of rides, frequency of rides, length of rides, etc. As another option, the user points manager 440 determines the number of points based on the user's reward history, e.g., giving more points to users that more frequently reward their AVs.

In some embodiments, a user may earn additional points. For example, the fleet management system 120 may ask the user to assist with a maintenance task, such as removing trash, relocating missing items, cleaning sensors, etc. User-assisted maintenance tasks are described in application Ser. No. 16/907,505, incorporated herein by reference. If the fleet management system 120 determines that the user successfully completes a maintenance task, the user points manager 440 adds reward points to the user's account. As another example, if the user reports maintenance issues to the fleet management system 120, the user points manager 440 adds reward points to the user's account. In some embodiments, a user may purchase more reward points, or use promotions or offers provided by the fleet management system 120 to obtain more reward points. As still another example, the mobile device interface 415 and/or in-vehicle interface 420 provides games or trivia questions that a user can play or answer to earn reward points.

In some embodiments, points in a user's account may expire if they are not used. For example, a point has a lifespan of 1 month, and if the user does not give the point to an AV within the month, the point expires and the user points manager 440 removes it from the user's account. As another example, in the flower-based system, a flower in the user's account can, after a set period of time, begin to wilt (indicating they are about to expire) and, at a later point in time, the user points manager 440 can remove the flower from the user's account if it has not been rewarded to an AV. Causing the points to expire may encourage users to provide rewards to AVs and prevents an excess of points from accumulating in a user's account.

The preference learning module 445 learns user preferences based on rewards provided by users to the AVs. If a user inputs a particular AV feature leading to the reward, as described with respect to FIGS. 2 and 3, the preference learning module 445 may use this input to select AV features or settings for the user's future rides. For example, if in a reward given to an AV after a first ride, the user indicates that they liked a particular drop-off point selected by the AV. If the user later requests a second ride to the same location, the fleet management system 120 can instruct the AV selected for the second ride to use the same drop-off point for that location. The preference learning module 445 may also infer user preferences based on rewards when the user does not give a specific reason for the reward. As described further below, the vehicle manager 450 may maintain AV logs describing AV behaviors. The preference learning module 445 may analyze data in the AV log for an AV from a time period prior to the user providing a reward to the AV to identify a possible action that led to the reward. For example, if the in-vehicle interface pointed out something interesting that the AV identified in its environment (e.g., a duck with ducklings walking near the AV) to the user and the user then rewards the AV via the in-vehicle interface, the preference learning module 445 may determine that the user would like to be shown cute animals the AV spots on future rides.

The vehicle manager 450 manages and communicates with the fleet of AVs 110. The vehicle manager 450 assigns the AVs 110 to various tasks and directs the movements of the AVs 110 in the fleet. The vehicle manager 450 includes a vehicle dispatcher 455, an AV points manager 460, and an AV learning module 465. The vehicle dispatcher 455 selects AVs from the fleet to perform various tasks and instructs the AVs to perform the selected tasks. The AV points manager 460 manages the reward points in the AVs' accounts that were rewarded to the AVs from the users. The AV learning module 465 learns preferences across many users and may adjust AV features based on the preferences. In some embodiments, the vehicle manager 450 includes additional functionalities. For example, the vehicle manager 450 instructs AVs 110 to drive to other locations while not servicing a user, e.g., to improve geographic distribution of the fleet, to anticipate demand at particular locations, etc. The vehicle manager 450 may also instruct AVs 110 to return to an AV facility for fueling, inspection, maintenance, or storage.

The vehicle dispatcher 455 receives a ride request from the mobile device interface 415. The vehicle dispatcher 455 selects an AV 110 service the ride request based on the information provided in the ride request, e.g., the pickup location, a drop-off location, a number of passengers, etc. The vehicle dispatcher 455 or another system may maintain or access data describing each of the AVs in the fleet of AVs 110, including current location, service status (e.g., whether the AV is available or performing a service; when the AV is expected to become available; whether the AV is scheduled for future service), fuel or battery level, etc. The vehicle dispatcher 455 may select an AV for service in a manner that optimizes one or more factors, including fleet distribution, fleet utilization, and energy consumption. The vehicle dispatcher 455 may interface with one or more predictive algorithms that project future service requests and/or vehicle use, and select vehicles for services based on the projections. Having selected a particular AV for a ride request, the vehicle dispatcher 455 transmits instructions dispatching the selected AV. In particular, the vehicle dispatcher 455 instructs the selected AV to drive autonomously to the pickup location in the ride request and pick up the requesting user. After the user is in the AV, the vehicle dispatcher 455 instructs the AV to drive autonomously to a destination location.

The AV points manager 460 manages the reward points in the AVs' accounts. The AV points manager 460 or an AV database stores reward points rewarded to each AV in a respective AV account. The AV points manager 460 maintains the number of points rewarded to each AV based on rewards provided by users. When a user rewards an AV with a selected portion of the points in the user's account, the AV points manager 460 adds the selected portion of points to the AV's account. The AV points manager 460 may also store data describing individual reward, e.g., for each AV, the AV points manager 460 maintains a total number of points as well as data describing each reward, including the number of points rewarded, the time that the points were rewarded, and the user that provided the reward. The AV points manager 460 may also store features input by the user providing the reward, as described with respect to FIGS. 2 and 3, and/or data describing the AV's behavior prior to receiving the reward that may be correlated to the reward. In other embodiments, a separate AV log stores describing AV behavior during rides where rewards were received (e.g., actions taken by the AV, people or things identified in the AV's environment, etc.) and/or AV features (e.g., in-cabin features, software version or features, etc.).

The AV learning module 465 learns preferences across users based on rewards given by users to the AVs. For example, the AV learning module 465 compares the number of points rewarded to different AVs across the fleet of AVs 110 or across some subset of the fleet. To compare reward points across multiple AVs with different usage histories, the AV learning module 465 may perform a normalization algorithm, e.g., by comparing AV rewards over a particular time period (e.g., the last month), over a particular number of rides and/or distance driven; or by dividing the number of reward points by the number of rides and/or distance driven.

In one embodiment, the AV learning module 465 uses the comparison to identify one or more AVs with relatively low rewards for modification, e.g., for maintenance or servicing, or for software upgrades. For example, the AV learning module 465 ranks a group of AVs by normalized reward points and identifies the bottom percentile or bottom 5 percentile of AVs to return to a maintenance facility for inspection and possible maintenance, e.g., deep cleaning, tune-ups, parts replacement, software upgrades, etc. At the other end, the AV learning module 465 may identify one or more AVs with relatively high rewards, e.g., the top percentile or top 5 percentile, and look for trends within these AVs that may cause them to be receiving high rewards. The AV learning module 465 may use additional AV data, such as user-submitted ratings or reviews, or sensor data, to try to identify a particular feature leading to an AV's low ratings.

As noted above, in some cases, users may input particular AV features that caused the users to provide rewards to AVs. The AV learning module 465 may use this user input to compare AVs and identify AVs for modification. For example, if a portion of AVs have a particular interior feature, the AV learning module 465 may correlate this feature with high or frequent rewards and select AVs that do not have this feature for modification, e.g., to add the particular feature. As another example, the AV learning module 465 can use the AV logs to identify an action taken by the AV that may have led to rewards, and identify AVs that did not perform this action, or were not programmed to perform this action. For example, if one set of AVs notifies users of their arrival at a pickup location using a song, and another set of AVs notifies users of their arrival at a pickup location using a light show, the AV learning module 465 can determine if there is a difference in rewards given shortly after pickup between these two notification methods. If, for example, users of the light show AVs provide higher or more frequent rewards in the three minutes following pickup than the users of the song AVs, the AV learning module 465 can infer that users generally prefer the light show to the song. In response, the fleet management system 120 can reprogram the song AVs to provide the light show at pickup.

Example Method for Receiving an AV Reward

Figure 5:
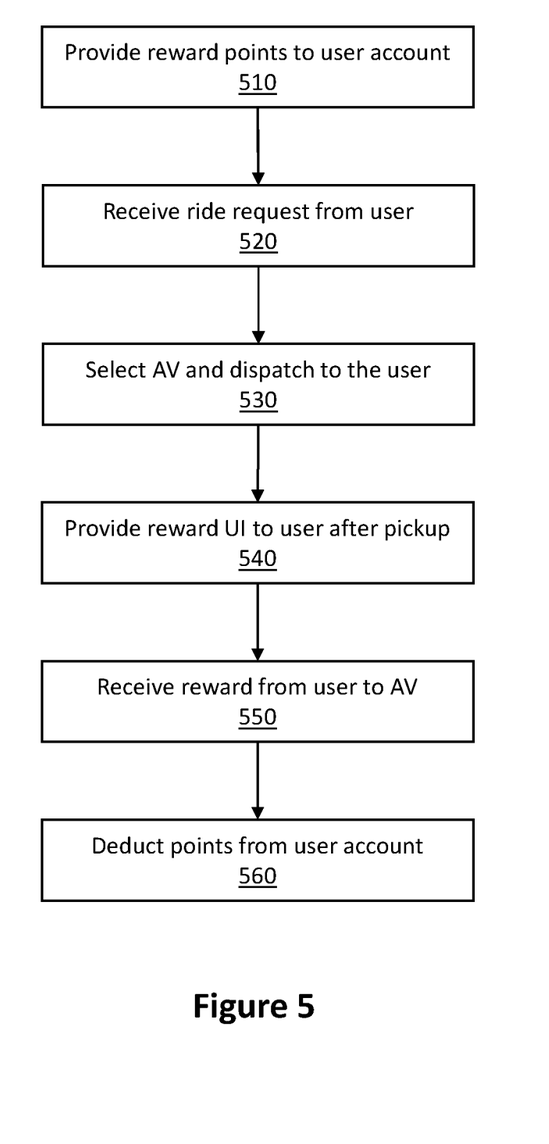
FIG. 5 is a flowchart of an example method for receiving an AV reward in an AV-based ride service according to some embodiments of the present disclosure.

FIG. 5 is a flowchart of an example method for receiving an AV reward in an AV-based ride service according to some embodiments of the present disclosure. A fleet management system, e.g., the user points manager 440, provides 510 reward points to the user account of a user of an AV ride service. The fleet management system, e.g., the mobile device interface 415, receives 520 a ride request from the user. The fleet management system, e.g., the vehicle dispatcher 455, selects 530 an AV from a fleet of AVs managed by the fleet management system, and dispatches the selected AV to a pickup location of the user.

The fleet management system provides 540 a reward UI to the user; the reward UI enables the user to select a portion of the reward points in the user's account to reward to the AV. The reward UI may be available after the user has been picked up by the AV and is riding in the AV. The reward UI may be available until some time after the user has been dropped off by the AV. The reward UI may be a mobile device interface 415 or an in-vehicle interface 420. Example reward UIs are shown in FIGS. 2 and 3.

The fleet management system, e.g., the mobile device interface 415 or the in-vehicle interface 420, receives 550 a reward from the user to the AV. The reward includes a portion of the points in the user's account. The fleet management system, e.g., the user points manager 440, deducts 560 the portion of points rewarded to the AV from the user's account. The fleet management system, e.g., an AV points manager 460, may further add the reward points to an account associated with the AV.

Example Method for Identifying AVs for Modification Based on Rewards

Figure 6:
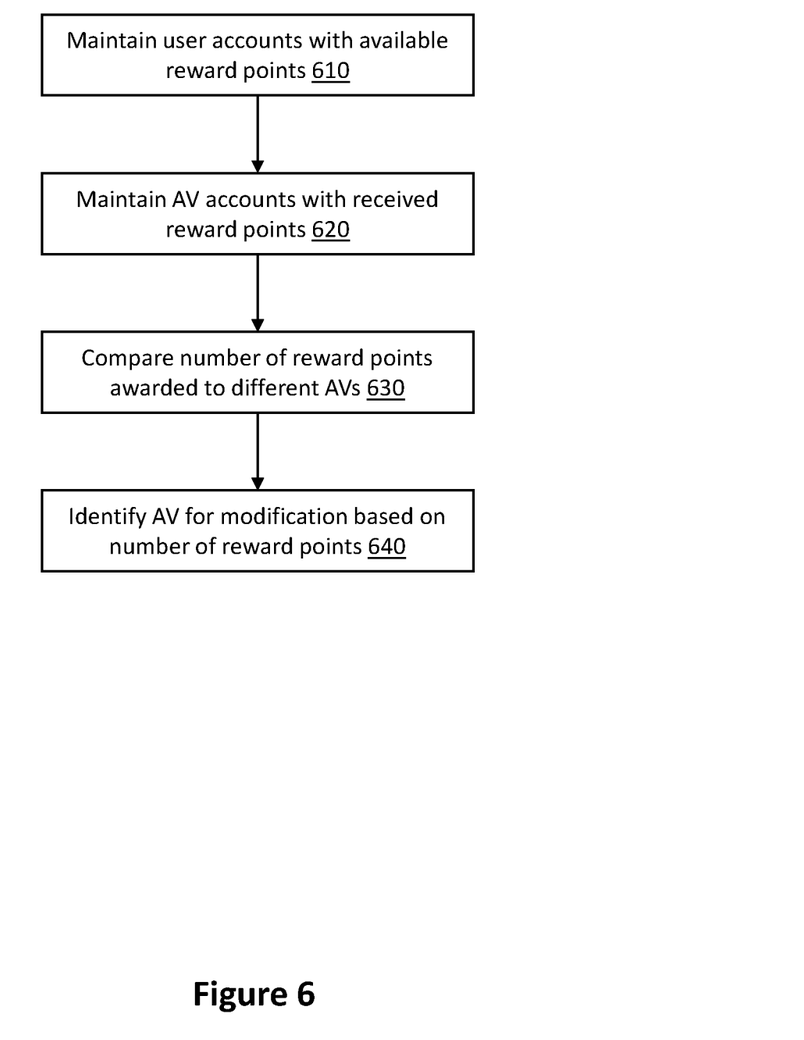
FIG. 6 is a flowchart of identifying AVs for modification based on a reward system according to some embodiments of the present disclosure.

FIG. 6 is a flowchart of identifying AVs for modification based on a reward system according to some embodiments of the present disclosure. The fleet management system, e.g., the user points manager 440, maintains 610 user accounts associated with users of a ride service provided by the AV fleet 110. The user accounts each include reward points available the respective user that the user can use to reward the AVs providing the ride service. The fleet management system, e.g., the AV points manager 460, also maintains 620 AV accounts that include points rewarded to the AVs by the users of the AVs.

The fleet management system, e.g., the AV learning module 465, compares 630 the number of reward points rewarded to different AVs in the fleet. The fleet management system, e.g., the AV learning module 465, identifies 640 one or more AVs for modification based on the AV(s) reward points. For example, the AV learning module 465 identifies an AV having a relatively low number of reward points, e.g., being ranked below other AVs in a number or normalized number of reward points. In this example, the AV learning module 465 may compare AV features or behaviors to identify a possible cause of the identified AV(s) low reward points, e.g., software features, interior features, or possible maintenance issues, and modify the lower-rewarded AVs to better meet user expectations or preferences. Alternatively, the AV learning module 465 may identify AVs having a relatively high number of reward points. In this example, the AV learning module 465 may identify one or more features that led to the high reward points, and the fleet management system 120 may determine to implement the identified feature(s) in other AVs to improve the overall quality of the AV fleet.

Select Examples

Example 1 provides a method for receiving feedback from a user of an AV ride service including maintaining a user account associated with a user of a ride service, the user account including a first number of points provided to the user; receiving a ride request from the user, the ride request including a pickup location of the user; selecting an AV to service the ride request from a fleet of AVs; subsequent to the AV initiating the ride service at the pickup location, providing, to the user, an interface enabling the user to select at least a portion of the points in the user account to provide as a reward to the AV; receiving a reward of a second number of points from the user to the AV; and deducting the second number of points from the first number of points in the user account.

Example 2 provides the method of according to example 1, where the first number of points are provided to the user at a first time, and the method further includes adding additional points to the user account at a second time that is a fixed time period after the first time.

Example 3 provides the method according to example 1 or 2, the method further including determining that the user has engaged the ride service for at least a threshold number of rides, and adding additional points to the user account in response to the user engaging the ride service for at least the threshold number of rides.

Example 4 provides the method according to any of the preceding examples, the method further including determining the first number of points to provide to the user based on historical ride data describing the user's usage of the ride service.

Example 5 provides the method according to any of the preceding examples, the method further including requesting that the user perform a maintenance task in the AV or a second AV; determining that the user has completed the maintenance task; and adding additional points to the user account in response to the user performing the maintenance task.

Example 6 provides the method according to any of the preceding examples, the method further including maintaining, in an AV account, a number of points rewarded to the AV; and in response to receiving the reward of the second number of points from the user to the AV, adding the second number of points to the AV account.

Example 7 provides the method according to example 6, the method further including providing, in a user interface, a display to the user of the number of points in the AV account.

Example 8 provides the method according to any of the preceding examples, where the interface further enables the user to input a reason for rewarding the AV, and the method further includes receiving, from the user, the reason for rewarding the AV.

Example 9 provides the method according to any of the preceding examples, the method further including accessing an AV log describing actions taken by the AV for a period of time prior to receiving the reward of the second number of points from the user to the AV; and identifying at least one action in the AV log that may have contributed to the reward.

Example 10 provides the method according to example 9, the method further including accessing a plurality of AV logs including the AV log, each of the plurality of AV logs including actions taken by an AV during a respective period of time prior to the AV receiving a reward; and identifying a common action in a subset of the plurality of AV logs.

Example 11 provides the method according to any of the preceding examples, the method further including identifying a reason for the reward to the AV, receiving a second ride request from the user, selecting a second AV to service the second ride request, and selecting a second AV to service the second ride request.

Example 12 provides a method for receiving feedback for an autonomous ride service that includes maintaining a plurality of user accounts associated with respective users of a ride service, each of the plurality of user accounts including points for the respective user to reward AVs providing a ride service to the user; maintaining a plurality of AV accounts associated respective AVs in a fleet of AVs, each of the plurality of AV accounts comprising points rewarded to the respective AV by users of the AV; comparing the points rewarded to a first AV of the plurality of AVs to the points rewarded to at least one other of the plurality of AVs; and identifying the first AV for modification based on the points rewarded to the first AV relative to the points rewarded to the at least one other AV.

Example 13 provides the method according to example 12, further including: for at least a portion of the rewards to the AVs, accessing an AV log describing actions taken by the AV for a period of time prior to the AV receiving the reward; and identifying at least one action in the AV log that may have contributed to the reward; where identifying the first AV for modification includes identifying an AV that did not perform the action.

Example 14 provides the method according to example 12 or 13, further including: for at least a portion of the rewards to the AVs, receiving user input indicating an AV feature leading to the reward; where identifying the first AV for modification includes identifying an AV that does not have the AV feature.

Example 15 provides the method according to any of examples 12 through 14, where the at least one other of the plurality of AVs has a first software feature, and the modification includes installing the first software feature on the first AV.

Example 16 provides the method according to any of examples 12 through 14, where the at least one other of the plurality of AVs has a first in-cabin feature, and the modification includes installing the in-cabin feature on the first AV.

Example 17 provides the method according to any of examples 12 through 16, further including in response to identifying the first AV, instructing the first AV to drive to a maintenance facility.

Example 18 provides a system for receiving AV rider feedback that includes a user data manager, a UI server, and a vehicle manager. The user data manager is to maintain, in a user account of a user of a ride service, a number of points provided to the user. The UI server is to receive a ride request to provide a ride to the user, the ride request including a pickup location; and receive a reward of a portion of points in the user account selected by the user to provide to an AV as a reward to the AV. The vehicle manager is to select, from a fleet of AVs, an AV to service the ride request; and instruct the selected AV to drive to the pickup location and pick up the user, where the UI server receives the reward subsequent to the AV picking up the user.

Example 19 provides the system according to example 18, where the user points manager is further to deduct selected portion of points from the number of points in the user account.

Example 20 provides the system according to example 18 or 19, further including an AV points manager to maintain, in an AV account associated with the selected AV, a number of points rewarded to the AV; and add the portion of points rewarded by the user to the AV account.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    maintaining a user account associated with a user of a ride service, the user account comprising a first number of points provided to the user;
    receiving a first ride request from the user, the first ride request comprising a pickup location of the user and a destination location;
    autonomously driving a first autonomous vehicle (AV) from a fleet of Avs from the pickup location to the destination location to service the first ride request;
    while servicing the first ride request, generating an AV log comprising autonomous driving actions taken by the first AV, each autonomous driving action associated with a respective time at which the autonomous driving action was performed;
    while servicing the first ride request, providing, to the user, an interface enabling the user to select at least a portion of the points in the user account to provide as a reward to the first AV;
    receiving a reward of a second number of points from the user to the first AV via the interface, the reward received at a particular time;
    deducting the second number of points from the first number of points in the user account;
    correlating the reward with an autonomous driving action of the first AV based on the particular time and the AV log, the AV log indicating that the first AV performed the autonomous driving action during a time window prior to receiving the reward, the AV log comprising additional autonomous driving actions performed before the time window or after the time window;
    identifying the autonomous driving action as an AV feature preference of the user;
    dispatching a second AV to service a second ride request from the user; and
    performing, by the second AV, the autonomous driving action correlated with the reward while servicing the second ride request.

2. The method of claim 1, wherein the first number of points are provided to the user at a first time, the method further comprising:
    adding additional points to the user account at a second time that is a fixed time period after the first time.

3. The method of claim 1 further comprising:
    determining that the user has engaged the ride service for at least a threshold number of rides; and
    adding additional points to the user account in response to the user engaging the ride service for at least the threshold number of rides.

4. The method of claim 1 further comprising:
    determining the first number of points to provide to the user based on historical ride data describing the user's usage of the ride service.

5. The method of claim 1, further comprising:
    requesting that the user perform a maintenance task in the first AV;
    determining that the user has completed the maintenance task; and
    adding additional points to the user account in response to the user performing the maintenance task.

6. The method of claim 1, further comprising:
    maintaining, in an AV account, a number of points rewarded to the first AV; and
    in response to receiving the reward of the second number of points from the user to the first AV, adding the second number of points to the AV account.

7. The method of claim 6, further comprising providing, in a user interface, a display to the user of the number of points in the AV account.

8. The method of claim 1, further comprising:
    accessing a plurality of AV logs comprising the AV log, each of the plurality of AV logs comprising an autonomous driving action taken by an AV during a respective time window prior to the AV receiving a reward;
    identifying a common action in a subset of the plurality of AV logs; and
    identifying the common action as the AV feature preference, wherein the second AV performs the common action while servicing the second ride request.

9. The method of claim 1 further comprising:
adjusting a software setting of the second AV so that the second AV is programmed according to the AV feature preference.

10. A system for controlling autonomous vehicle (AV) behavior based on rider feedback comprising:
a fleet of autonomous vehicles (AVs) comprising:
a first AV to autonomously drive from a pickup location to a destination location to service a first ride request from a user, and, while servicing the first ride request, generate an AV log comprising autonomous driving actions taken by the first AV, each autonomous driving action associated with a respective time at which the autonomous driving action was performed; and
a second AV to service a second ride request from the user and, while servicing the second ride request, perform the autonomous driving action, the autonomous driving action identified as an AV preference of the user;
a user data manager to:
maintain, in a user account of the user of a ride service, a number of points provided to the user;
correlate a reward of a portion of points from the user account given by the user to the first AV with an autonomous driving behavior of the first AV based on the AV log and a particular time at which the reward was received, the AV log indicating that the first AV performed the autonomous driving action during a time window prior to receiving the reward, and the AV log comprising additional autonomous driving actions performed before the time window or after the time window; and
identify the behavior as an AV feature preference of the user;
a user interface (UI) server to:
receive the first ride request to provide a ride to the user, the first ride request comprising the pickup location and the destination location;
receive the reward of the portion of points in the user account selected by the user to provide as a reward to the first AV, the reward received at the particular time; and
receive the second ride request to provide a second ride to the user.

11. The system of claim 10, wherein the user points data manager is further to deduct selected portion of points from the number of points in the user account.

12. The system of claim 10, further comprising an AV points manager to:
maintain, in an AV account associated with the first AV, a number of points rewarded to the first AV; and
add the portion of points rewarded by the user to the AV account.

13. The system of claim 10, wherein the user data manager is further to:
provide a first number of points to the user account at a first time; and
add additional points to the user account at a second time, wherein the second time is a fixed time period after the first time.

14. The system of claim 10, wherein the user data manager is further to:
determine that the user has engaged the ride service for at least a threshold number of rides; and
adding additional points to the user account in response to the user engaging the ride service for at least the threshold number of rides.

15. The system of claim 10, further comprising a vehicle manager to:
maintain, in an AV account, a number of points rewarded to the first AV; and
in response to receiving the reward of the portion of points in the user account selected by the user, adding the portion of points to the AV account.

16. The system of claim 15, wherein the UI server is further to provide, in a user interface, a display to the user of the number of points in the AV account.

17. The system of claim 10, wherein the UI server is further to receive, from the user, a reason for rewarding the first AV.

18. The system of claim 10, the vehicle manager further to:
adjust a software setting of the second AV so that the second AV is programmed according to the AV feature preference.

19. The method of claim 1, further comprising:
receiving, from a second user, a second reward of a second number of points to a third AV servicing a third ride request;
while servicing the third ride request, generating a second AV log comprising autonomous driving actions taken by the third AV;
correlating the second reward with a second autonomous driving action based on the second AV log, the second AV log indicating that the second AV performed the second autonomous driving action during a time window prior to receiving the second reward;
identifying the second autonomous driving action as a second AV feature preference of the second user;
in response to the AV feature preference and the second AV feature preference matching, identifying the AV feature preference as a fleet preference; and
based on the fleet preference, performing, by the second AV, the autonomous driving action while servicing the second ride request.

20. The method of claim 19, wherein identifying the AV feature preference as a fleet preference further comprises comparing a first rate of rewards received for AVs of a fleet of AVs that performed the autonomous driving action to a second rate of rewards for AVs of the fleet that did not perform the autonomous driving actions, the first rate of rewards greater than the second rate of rewards.

* * * * *